Patented June 5, 1928.

1,672,346

UNITED STATES PATENT OFFICE.

KARL SCHÖLLKOPF, OF DUSSELDORF-OBERKASSEL, GERMANY, ASSIGNOR TO RHEINISCHE KAMPFER-FABRIK GESELLSCHAFT MIT BESCHRANKTER HAFTUNG, OF DUSSELDORF-OBERKASSEL, GERMANY.

PURIFICATION OF INACTIVE MENTHOL.

No Drawing. Application filed November 5, 1926, Serial No. 146,564, and in Germany November 25, 1925.

The present invention refers to the purification of inactive menthol, the racemate of natural active menthol.

It has been stated that by hydrogenation of thymol in the presence of hydrogenating catalysts, preferably under pressure above atmospheric pressure, a mixture of isomeric menthols is produced, from which a solid racemate may be separated from a normally liquid mixture of isomeric menthols. Such processes are described in my following U. S. patents: 1,625,771 of April 19th, 1927, describing to heat thymol with catalysts promoting the hydrogenation and hydrogen under pressure, separating the inactive menthol from the liquid menthols mixture by physical methods and heating the latter mixture with catalysts promoting the hydrogenation and hydrogen under pressure. 1,629,002 of May 17th, 1927, describing the heating of the liquid menthols mixture from the hydrogenation of thymol after separation of the inactive menthol with alkaline metal mentholate, application for Letters Patent Serial No. 118,834 filed June 26th, 1926, describing the heating of the liquid menthols mixture with dehydrogenating catalysts and the dehydrogenated mixture with hydrogenating catalysts.

The present invention is based on the new discovery that the racemate of natural menthol, obtained according to the quoted processes, is not completely pure, but contains an admixture of a hitherto unknown isomeric menthol belonging to the isomenthone series, which is proved by the fact that the oxidation of the said isomeric menthol gives isomenthone, the semicarbazone of which has the melting point of 217 degrees centigrade. The isomeric menthol has the melting point of 52-53 degrees centigrade (the acid phthalate of the said menthol having the melting point of 113-115 degrees centigrade), and is different from the known inactive neomenthol (belonging as the racemate of natural active menthol to the menthone series) having the melting point of 51 degrees centigrade (the acid phthalate of which having the melting point of 177 degrees centigrade, see Pickard and Littlebury, Journal of the Chemical Society, vol. 101, page 109 (1912)).

The present process has the object to purify the racemate of the active natural menthol obtained from the hydrogenation of thymol or inactive menthone or isomeric menthols in the presence of hydrogenating catalysts at ordinary atmospheric or increased pressure and separation of the racemate of natural menthol from the isomers by means of freezing and centrifuging or by fractional distillation of the hydrogenation mixture.

The present process employs the said separation methods, either each alone or first the one and afterwards the other until a fraction of the racemate having the melting point of about 30-34 degrees centigrade is obtained, and the feature of the present process is that the crude racemate of natural active menthol is transformed into a crystallizable ester, either an acid ester of a polybasic acid, as for instance of phthalic acid or succinic acid, or a neutral ester, as for instance of paranitrobenzoic acid, of carbonic acid or boric acid, whereupon the ester is purified by crystallization, and the menthol is regenerated by saponification. In this way, in a practical, commercial way the pure racemate of natural active menthol, having the melting point of 34-36 degrees centigrade and having the taste and the odor of natural active menthol may be obtained.

*Example 1.*—100 parts by weight of thymol or inactive menthone (for instance the product of the action of dehydrogenating catalysts on the liquid product of the hydrogenation of thymol after separation from the inactive crystallizable menthol) or isomeric menthols (for instance the liquid menthols mixture of the hydrogenation of thymol) or a mixture of thymol with menthone or a mixture of thymol with isomeric menthols or a mixture of thymol with menthone and isomeric menthols is hydrogenated in an autoclave with five parts by weight of a nickel catalyst or other catalysts promoting hydrogenation at 180 degrees centigrade (or more or less) under a pressure of about 10-30 atmospheres of hydrogen (or more or less). The absorption of hydrogen having been finished the mixture is agitated in the presence of hydrogen, under pressure until the product of the hydrogenation shows a melting point of about 15-20 degrees centigrade, which may be determined by examination of a sample taken from the mixture. The product of the hydrogenation is subjected to a fractional distillation preferably under vacuum or diminished pressure. Firstly the lower boiling isomers, chiefly neomenthol, of the boiling point of 212-214 degrees centigrade at 760 mm. pressure are distilled off. The medium fraction of the boiling point 215-217 degrees centigrade contains chiefly the racemate of natural menthol. The higher boiling fraction of the boiling point of 218 degrees centigrade consists chiefly of the newly discovered isomeric menthol of the melting point of 52-53 degrees centigrade (the acid phthalate of which has the melting point 113-115 degrees centigrade) and is separated as the residue of the distillation. By a second distillation of the medium fraction of the boiling point of 215-217 degrees centigrade one obtains an inactive menthol of the melting point of 30-34 degrees centigrade having an admixture of small quantities of the higher boiling and higher melting menthol.

Instead of the fractional distillation described hereinbefore one may subject the hydrogenation mixture to a freezing process, separate the liquid portion from the solidified, for instance by centrifuging, subject the solidified portion if desired after melting to a new freezing at somewhat different (generally higher) temperature than before and separate again the solidified portion from the liquid. One may also subject the firstly solidified portion to a fractional distillation preferably under vacuum or diminished pressure. Also in these ways one obtains an inactive menthol of the melting point of about 30-34 degrees centigrade. One may obtain about 60 parts by weight of the said inactive menthol from the hydrogenation product.

100 parts by weight of the inactive menthol of the melting point of 30-34 degrees centigrade are mixed with 95 parts by weight of phthalic acid anhydride, preferably by agitation, during about 2 hours at about 120 degrees centigrade, which operation may be carried out in an iron vessel provided with agitator. One allows the mixture to cool somewhat and adds to the molten mass, when hot, 80 parts by weight of alcohol and mixes. The alcoholic solution obtained is allowed to cool, preferably assisted by the application of cooling agents (cold water, ice). From the cooled solution the acid phthalic acid ester of the inactive menthol is separated, which ester has in this state generally the melting point of about 129-131 degrees centigrade (or some degrees less), and is purified by a second crystallization from alcohol, the pure ester having the melting point of 133 degrees centigrade. By heating the purified ester with aqueous alkaline solutions, for instance aqueous caustic soda solution or aqueous caustic potash solution of about 10-20% in the amount equivalent to the phthalic acid, to the boiling point and by distillation with steam the pure inactive menthol of the melting point of 34-36 degrees centigrade is driven off and obtained by condensation.

The alcoholic mother solution of the second crystallization may be used as addition to a second hot molten mass of the esterification.

*Example 2.*—100 parts by weight of the crude inactive menthol of the melting point of 30-31 degrees centigrade are heated under agitation with 56 parts by weight of succinic acid anhydride about 3 hours to about 130 degrees centigrade. One adds to the somewhat cooled, but hot molten mass about 150 parts by weight of benzine of boiling point of 90-100 degrees centigrade. After further cooling down the crude acid succinic acid ester of inactive menthol, having the melting point of 82-83 degrees centigrade is separated. The acid ester may be recrystalized from benzine and is obtained in pure state having the melting point of 85 degrees centigrade. By heating with aqueous caustic potash solution and distillation with steam one obtains pure inactive menthol.

*Example 3.*—100 parts by weight of crude inactive menthol of the melting point of 30-31 degrees centigrade are mixed with 118 parts by weight of paranitrobenzoylchloride and 100 parts of pyridine free of water. The reaction develops heat. After standing during 2 hours the paranitrobenzoic ester of inactive menthol formed is dissolved in 200 parts by weight of benzole and the pyridine washed away by means of dilute hydrochloric acid. After the benzole having been distilled off one obtains the ester having the melting point of about 89-90 degrees centigrade. By a recrystallization from alcohol the pure paranitrobenzoic ester having the melting point of 91-92 degrees centigrade is obtained. By saponification of the ester by means of alcoholic caustic potash and distillation with steam one obtains the pure inactive menthol.

*Example 4.*—100 parts by weight of crude inactive menthol having the melting point of 32-34 degrees centigrade are dissolved in 100 parts by weight of toluol and 80 parts by weight of pyridine free of water, and a solution of 33 parts by weight of phosgene in toluol is added under good cooling. One allows the mixture to stand at low temperature during some hours and introduces steam, whereby pyridine and small amounts of unchanged menthol are distilled off. As residue remains crystalized mentholcarbonate which is washed with hot water and is crystallized from alcohol. By two crystallizations one obtains pure carbonate of inactive menthol, having the melting point of 97–98 degrees centigrade, from which one obtains by saponification by means of boiling alcoholic or aqueous caustic potash solution and distillation with steam pure inactive menthol.

*Example 5.*—100 parts by weight of crude inactive menthol having the melting point of 33–34 degrees centigrade are heated under good agitation with 13½ parts by weight of boric acid to about 140–160 degrees centigrade. The water formed is distilled off during the operation. The crude boric ester of the inactive menthol is crystallized twice from benzole, and the pure ester, having the melting point of 135–137 degrees centigrade is saponified by means of being heated with water in an autoclave to about 120 degrees centigrade. The pure inactive menthol is distilled off by means of steam.

I claim:—

1. The process for preparing pure inactive menthol, the racemate of natural menthol, having the melting point of 34–36 degrees centigrade, the acid phthalate of which having the melting point of 133 degrees centigrade, which consists in preparing a mixture of the racemate with isomeric menthols by hydrogenation, separating the solidifiable menthol from the liquid constituents, transforming the separated solidifiable menthol into a crystallizable ester, crystallizing the ester from a solvent, saponifying the purified ester and distilling the menthol.

2. The process for preparing pure inactive menthol, the racemate of natural menthol, having the melting point of 34–36 degrees centigrade, the acid phthalate of which having the melting point of 133 degrees centigrade, which consists in hydrogenating thymol in the presence of hydrogenating catalysts, separating the solidifiable menthol from the liquid constituents, transforming the separated solidifiable menthol into a crystallizable ester, crystallizing the ester from a solvent, saponifying the purified ester and distilling the menthol.

3. The process for preparing pure inactive menthol, the racemate of natural menthol, having the melting point of 34–36 degrees centigrade, the acid phthalate of which having the melting point of 133 degrees centigrade, which consists in hydrogenating thymol with hydrogenating catalysts, separating the solidifiable menthol from the liquid constituents, fractionating the separated crude racemate, separating the fraction boiling between 212–214 degrees centigrade containing neomenthol and the fraction boiling at 218 degrees centigrade containing an isomeric menthol, transforming the medium fraction boiling between 215–217 degrees centigrade into a crystallizable ester, crystallizing the ester from a solvent, saponifying the purified ester and distilling the menthol.

4. The process for preparing pure inactive menthol, the racemate of natural menthol, having the melting point of 34–36 degrees centigrade, the acid phthalate of which having the melting point of 133 degrees centigrade, which consists in hydrogenating thymol with hydrogenating catalysts under pressure, separating the solidifiable menthol from the liquid constituents, fractionating the separated crude racemate, separating the fraction boiling between 212–214 degrees centigrade containing neomenthol and the fraction boiling at 218 degrees centigrade containing an isomeric menthol, transforming the medium fraction boiling between 215–217 degrees centigrade into a crystallizable ester, crystallizing the ester from a solvent, saponifying the purified ester and distilling the menthol.

In testimony whereof I hereunto affix my signature.

KARL SCHÖLLKOPF.